Sept. 5, 1933.                J. HOIDN                1,925,083
                      HOLDER FOR ICE CREAM CONES
                         Filed April 11, 1932

Inventor
John Hoidn
By Arnold du Ehrlich
   Atty.

Patented Sept. 5, 1933

1,925,083

UNITED STATES PATENT OFFICE 1,925,083

HOLDER FOR ICE CREAM CONES

John Hoidn, Chicago, Ill.

Application April 11, 1932. Serial No. 604,606

1 Claim. (Cl. 45—141)

This invention relates to a holder for ice cream cones which has for its particular object the provision of a device whereby a plurality of cones may be held for filling with ice cream.

When it is desired to fill a plurality of cones, the usual procedure has been to grasp the cones in one hand, while the other hand is used to grasp an ice cream dipper.

It has been found difficult to hold three or more cones with the hand without the cones being marred or broken, and it is one of the objects of this invention to provide a holder having formed therein a plurality of openings in which the cones to be filled may be inserted.

Another object of the invention is the provision of a holder which may be movably arranged beneath a counter or serving tray.

Other objects will appear in the course of the following specification and accompanying drawing, wherein like characters represent corresponding parts and in which.

Figure 1:
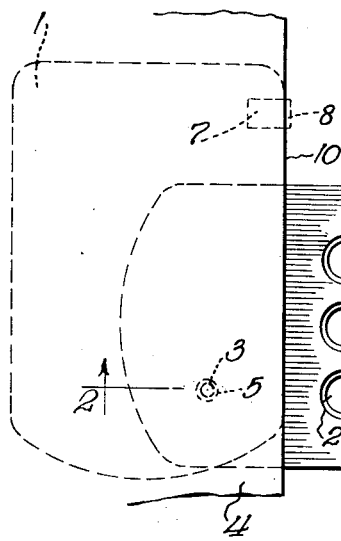
Figure 1 is a top plan a holder arranged beneath a counter.
Figure 2:
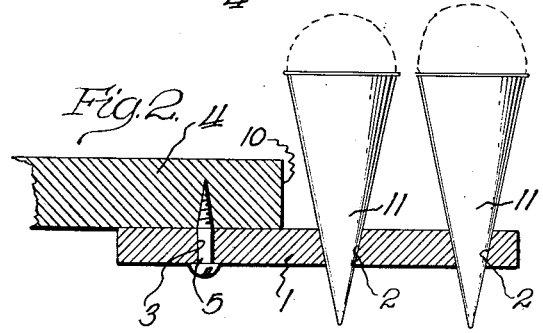
Figure 2 is a longitudinal section taken on the line 2—2 of Figure 1.
Figure 3:
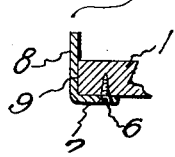
Figure 3 is a detail section taken on the line 3—3 of Figure 1.

Referring to Figures 1 to 3 inclusive 1 indicates a plate in which are arranged a plurality of spaced tapered openings 2 at one end thereof, and a perforation 3 at a corner of the other end. The plate 1 is adapted to be arranged beneath the top of a counter 4 or the like, and pivotally attached thereto by the screw 5 which is attached to the counter 4 through the perforation 3. Attached to the bottom face of the plate 1 as at 6 is a stop plate 7 having an upwardly projecting leg 8 adapted to engage the side 9 of the plate 1, and protruding there above, whereby when the plate 1 is moved to inoperative position, as shown in dotted lines in Figure 1, the leg 8 will engage the edge 10 of the counter 4, thereby limiting movement of the plate 1. The openings 2 are adapted to receive cones 11 to be filled with ice cream.

From the foregoing it will be seen that a plurality of cones may be held and filled without being marred or broken.

Figure 4:
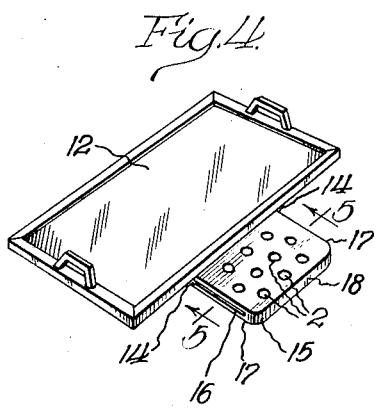
Figure 4 is a perspective view depicting a holder arranged beneath a serving tray.
Figure 6:
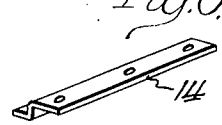
Figure 6 is a perspective view of one of the guides.
Figure 5:
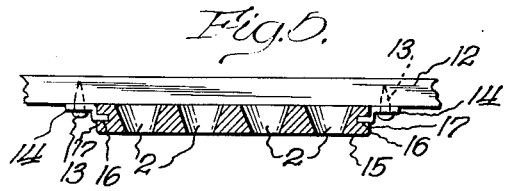
Figure 5 is a cross section taken on the line 5—5 of Figure 4.

Referring now to Figures 4 to 6 inclusive, 12 indicates a serving tray to which are attached as at 13 the Z shaped guides 14. A plate 15 having grooves 16 formed in the sides 17 is adapted to be slidably carried by the guides 13. The grooves 16 terminate in close proximity to the end 18 of the plate 15 whereby to limit sliding movement thereof.

It is to be understood that various changes may be made in the details of construction of the device without departing from the spirit of the invention or the appended claim.

Having thus described my invention, what I claim is:

A holder of the class described including in combination a supporting element, a plate having one end normally disposed beneath said supporting element, means for pivotally supporting the plate relative to the supporting element to permit the other end of the plate to be extended from the support or inoperatively disposed beneath the support, an angular stop secured to one side of the plate to limit its movement to inoperative position, and the second end of said plate having a plurality of tapering openings therein to receive and support ice cream cones while being filled.

JOHN HOIDN.